(12) United States Patent
Chang et al.

(10) Patent No.: US 6,371,997 B1
(45) Date of Patent: Apr. 16, 2002

(54) METHOD FOR MANUFACTURING LITHIUM POLYMER SECONDARY BATTERY AND LITHIUM POLYMER SECONDARY BATTERY MADE BY THE METHOD

(75) Inventors: Youn-han Chang, Chungcheongnam-do; Jung-ho Kim, Cheonan, both of (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 09/553,286

(22) Filed: Apr. 20, 2000

(30) Foreign Application Priority Data

Apr. 21, 1999 (KR) .............................................. 99-14265

(51) Int. Cl.⁷ ................................................ H01M 6/00
(52) U.S. Cl. ..................... 29/623.5; 29/623.1; 29/623.3; 429/231.95
(58) Field of Search ..................... 429/231.95; 29/623.1, 29/623.3, 623.5

(56) References Cited

U.S. PATENT DOCUMENTS

| | | | | |
|---|---|---|---|---|
| 5,478,668 A | * | 12/1995 | Gozdz et al. | 429/127 |
| 5,746,781 A | * | 5/1998 | Velasquez et al. | 29/730 |
| 6,077,624 A | * | 6/2000 | Mitchell et al. | 429/217 |
| 6,143,042 A | * | 11/2000 | Rogers | 29/623.1 |

* cited by examiner

Primary Examiner—Gabrielle Brouillette
Assistant Examiner—Angela J. Martin
(74) Attorney, Agent, or Firm—Leydig, Voit & Mayer, Ltd.

(57) ABSTRACT

A method for manufacturing a lithium polymer secondary battery includes the steps of fabricating a unit cathode plate, a unit anode plate and a separator each having a plasticizer, extracting each plasticizer from the unit cathode plate, the unit anode plate and the separator and drying the same, stacking the cathode plate and the unit anode plate and interposing the separator therebetween to form a unit battery cell, and impregnating the unit battery cell with an electrolytic solution. Therefore, the battery productivity can be improved. Also, expanded metal or punched metal as well as a foil can be used as cathode and anode current collectors of the lithium polymer secondary battery.

19 Claims, 4 Drawing Sheets

METHOD FOR MANUFACTURING LITHIUM POLYMER SECONDARY BATTERY AND LITHIUM POLYMER SECONDARY BATTERY MADE BY THE METHOD

BACKGROUND OF THE INVENTION

1. Field of the Invention

The present invention relates to a lithium polymer battery, and more particularly, to a lithium polymer secondary battery using a hybrid polymer electrolyte and a manufacturing method thereof.

2. Description of the Related Art

Recently, according to the development of portable electronic apparatus such as cellular phones, notebook-type computers, camcorders and the like, research into secondary batteries capable of charging has been vigorously carried out.

Secondary batteries are classified into a variety of batteries, including nickel-cadmium (Ni—Cd) batteries, lead storage batteries, nickel metal hydride (Ni—MH) batteries, lithium secondary batteries, air-zinc storage batteries, and the like.

Among the above-mentioned batteries, lithium secondary batteries have a service life 3 times longer than Ni—Cd batteries or Ni—MH batteries which operate with 3.6 V and are widely used as the power source for electronic devices, and have excellent energy density per unit weight.

Lithium secondary batteries are fabricated by providing a cathode, an anode, and an organic electrolyte solution and a separator for supplying a passage for lithium ions between the cathode and the anode. Also, in the lithium secondary battery, electrical energy is generated by oxidation/reduction which takes place when the lithium ions are intercalated or deintercalated into/from the cathode or anode.

Lithium secondary batteries are classified into lithium ion batteries using a liquid electrolyte and lithium polymer batteries using a polymer electrolyte. Here, the polymer electrolyte for use in lithium secondary batteries includes pure solid polymer electrolyte, a gel polymer electrolyte and a hybrid polymer electrolyte.

The hybrid polymer electrolyte is prepared by filling an electrolyte into a porous polymer matrix having a submicron dimension or smaller.

The hybrid polymer electrolyte is used for increasing the workability by forming pores for injection of an electrolyte and imparting flexibility to electrode plates, and there has been proposed a method in which a plasticizer such as dibutyl phthalate (DBP) is added to an electrode active material composition and the plasticizer is extracted and removed with an organic solvent, such as ether, before assembling a battery.

In this connection, a method of manufacturing a lithium polymer battery employing a hybrid polymer electrolyte, which was proposed in U.S. Pat. Nos. 5,460,904, 5,478,668 and 5,705,297 by Bellcore Inc., of U.S.A., will now be briefly described.

First, a unit cathode plate and a unit anode plate are fabricated.

To this end, an acetone solvent, an electrode active material such as a cathode active material or an anode active material, a binder, a conductive agent and a plasticizer are mixed to form slurry. The slurry is made into a thin-film on a polyethylene (PET) base film with by a doctor-blade. Then, the PET base film is removed to produce an electrode sheet of the cathode or anode active material.

The cathode sheet is adhered to a cathode current collector and the anode sheet is adhered to an anode current collector, by applying heat and pressure through a laminating process, respectively. Here, the cathode or anode current collector is made of expanded metal having a plurality of openings formed by expansion due to application of external tension. The openings allow the plasticizer to be easily extracted in a unit battery cell having a bi-cell structure to be described later.

Then, the resultant structure is cut into a predetermined size to form the unit cathode plate and the unit anode plate.

Next, a unit cathode plate, a separator, a unit anode plate, a separator and a unit cathode plate are laminated sequentially and a laminating process is performed by applying heat and pressure to form a unit battery cell having a bi-cell structure.

Then, the unit battery cell having a bi-cell structure is immersed in an ether solution to extract the plasticizer. Here, the plasticizer extracting process is widely used in manufacturing PE or PP separators for use in lithium polymer secondary batteries or in fabricating woolen products.

Next, nine sheets of unit battery cells having a bi-cell structure are laminated to form 9 bi-cells and parallel-connected.

Then, a space produced by extracting the plasticizer is impregnated with an electrolyte solution and encased.

However, in the process of manufacturing the lithium polymer batteries, it is quite difficult to treat plasticizer-containing separators, impurities are easily adsorbed into the separators having viscosity due to the plasticizer, and the processing time is long due to extracting and drying the plasticizer in a bi-cell state, thereby noticeably lowering the manufacturing performance. Also, while performing extraction after laminating the bi-cell structure, bubbling may occur.

Also, in the case of manufacturing lithium polymer batteries using expanded metal as a current collector such as a cathode current collector or an anode current collector, since the directions of elongation of expanded metal and tension applied thereto are the same, permanent deformation may be caused due to elongation of the current collector in the continuous fabrication process of electrode plates such as cathodes or anodes. Thus, the process of manufacturing lithium polymer batteries using expanded metal as a current collector, is not compatible with mass production based on the continuous fabrication process.

Further, in the case of manufacturing lithium polymer batteries using a current collector of expanded metal, the batteries become thick. Also, after the current collector is elongated, the difference in the thickness is 10 $\mu$m or greater in regions of a 35 $\mu$m thick current collector. Thus, it is difficult to achieve thickness control in the course of adhering an electrode sheet to the current collector.

Instead of using a current collector of expanded metal, a current collector of punched metal having small pores or a foil may be used as a current collector in manufacturing a battery cell having a bi-cell structure. However, in this case, while the electrical conductivity is improved, the plasticizer cannot be easily extracted from the battery cell.

SUMMARY OF THE INVENTION

To solve the above problems, it is an object of the present invention to provide a lithium polymer secondary battery using a hybrid polymer electrolyte, which can employ a current collector of expanded metal or punched metal having small pores as well as a foil, and a manufacturing method thereof.

Accordingly, to achieve the above object, there is provided a method for manufacturing a lithium polymer secondary battery including the steps of fabricating a unit cathode plate, a unit anode plate and a separator each having a plasticizer, extracting each plasticizer from the unit cathode plate, the unit anode plate and the separator and drying the same, stacking the cathode plate and the unit anode plate and interposing the separator therebetween to form a unit battery cell, and impregnating the unit battery cell with an electrolytic solution.

Here, the unit cathode plate may be fabricated by forming a cathode active material layer on at least one surface of a cathode current collector and cutting the same into a predetermined size, and the unit anode plate may be fabricated by forming anode active material layer on at least one surface of an anode current collector and cutting the same into a predetermined size.

Also, the cathode active material layer may formed by laminating a cathode sheet made of a cathode active material slurry on the cathode current collector, or by directly coating a cathode active material slurry on the cathode current collector.

Also, the anode active material layer may be formed by laminating an anode sheet made of an anode active material slurry on the anode current collector, or by directly coating an anode active material slurry on the anode current collector.

Further, the anode current collector is preferably shaped of expanded metal, punched metal or a foil. Also, the cathode current is shaped of expanded metal, punched metal or a foil.

The battery cell may be constructed by a plurality of parallel-connected unit battery cells having a bi-cell structure.

According to another aspect of the present invention, there is provided a lithium polymer secondary battery having a unit cathode plate, a unit anode plate, a separator for insulating the unit cathode plate and the unit anode plate from each other, and a hybrid polymer electrolyte for supplying a movement passage of lithium ions, the lithium polymer secondary battery made by the method of the first aspect of the present invention, wherein the unit cathode plate has a cathode active material layer formed on at least one surface of a foil-shaped cathode current collector, and the unit anode plate has an anode active material layer formed on at least one surface of a foil-shaped anode current collector.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 1:
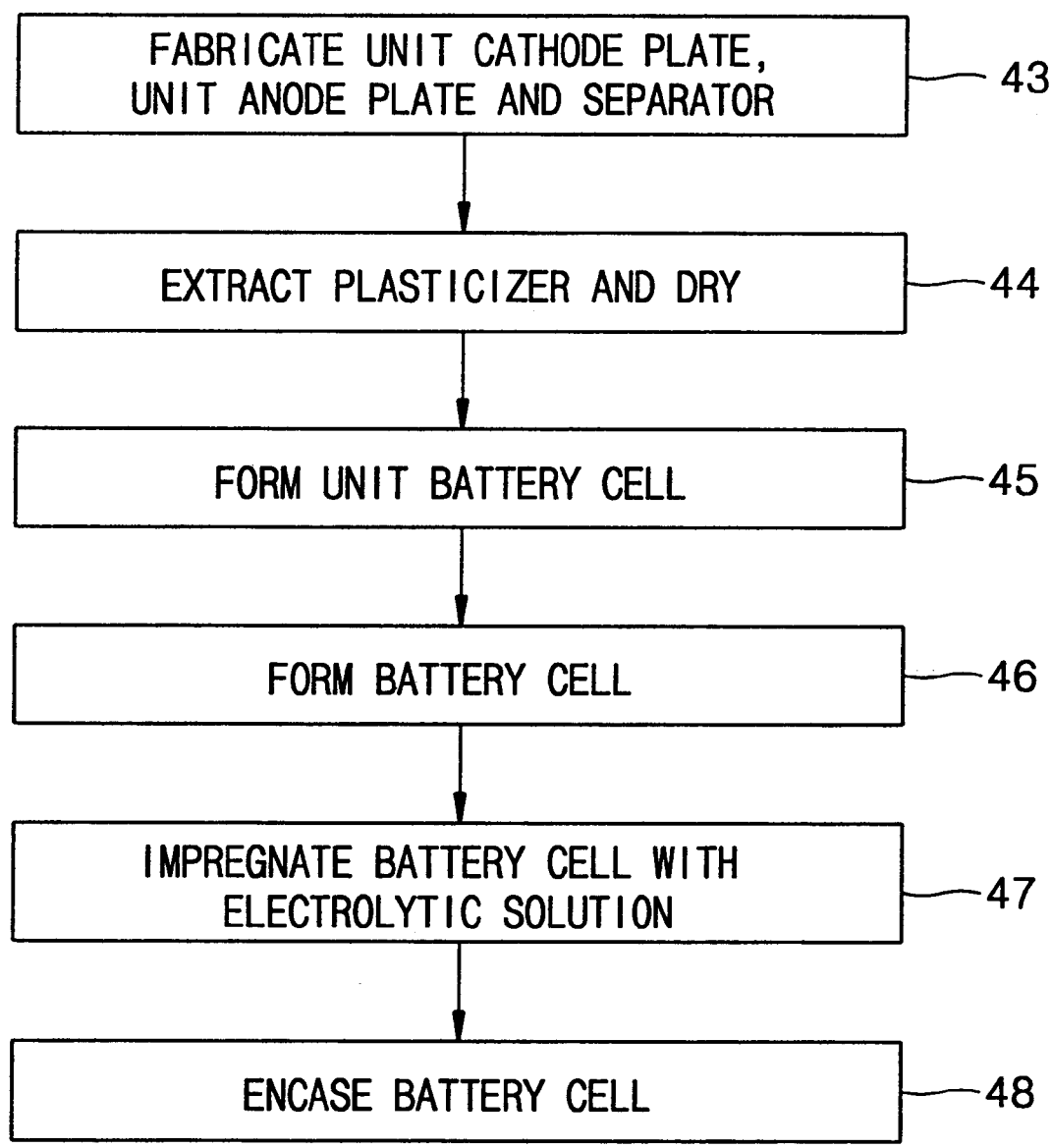
FIG. 1 is a flow chart illustrating a method of manufacturing a lithium polymer secondary battery according to the present invention.
Figure 2:
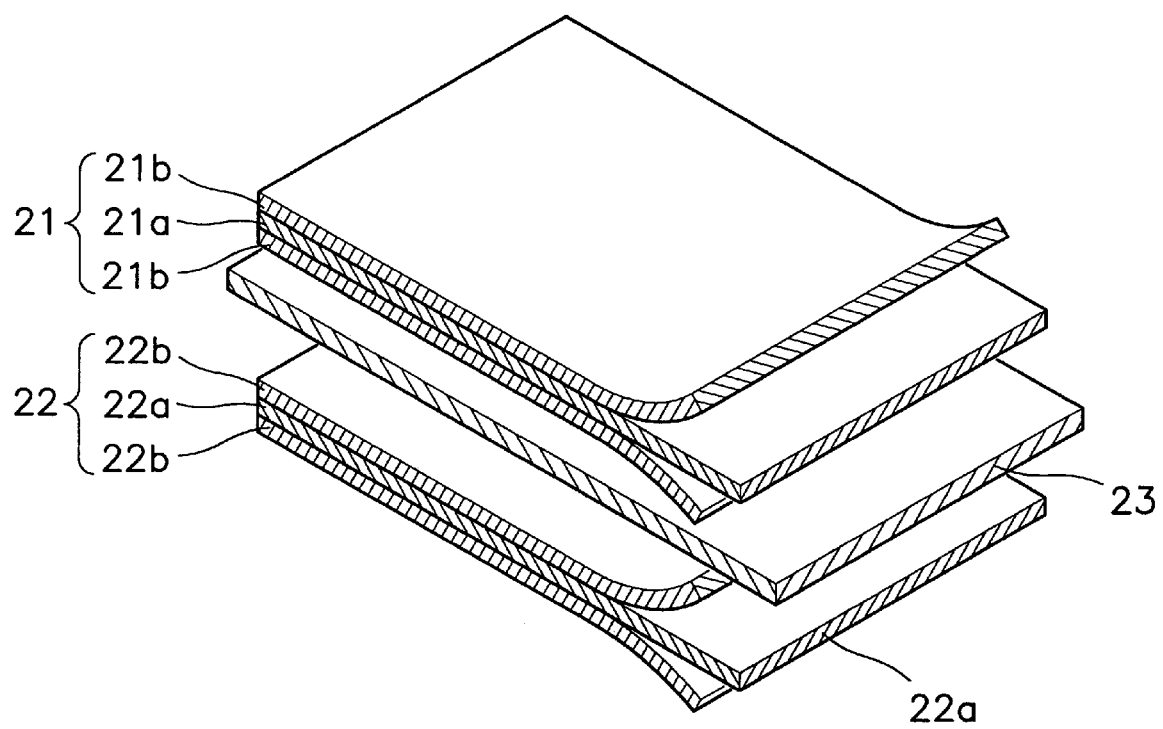
FIG. 2 is an exploded perspective view illustrating a unit battery cell having a mono-cell structure in a lithium polymer secondary battery.
Figure 3:
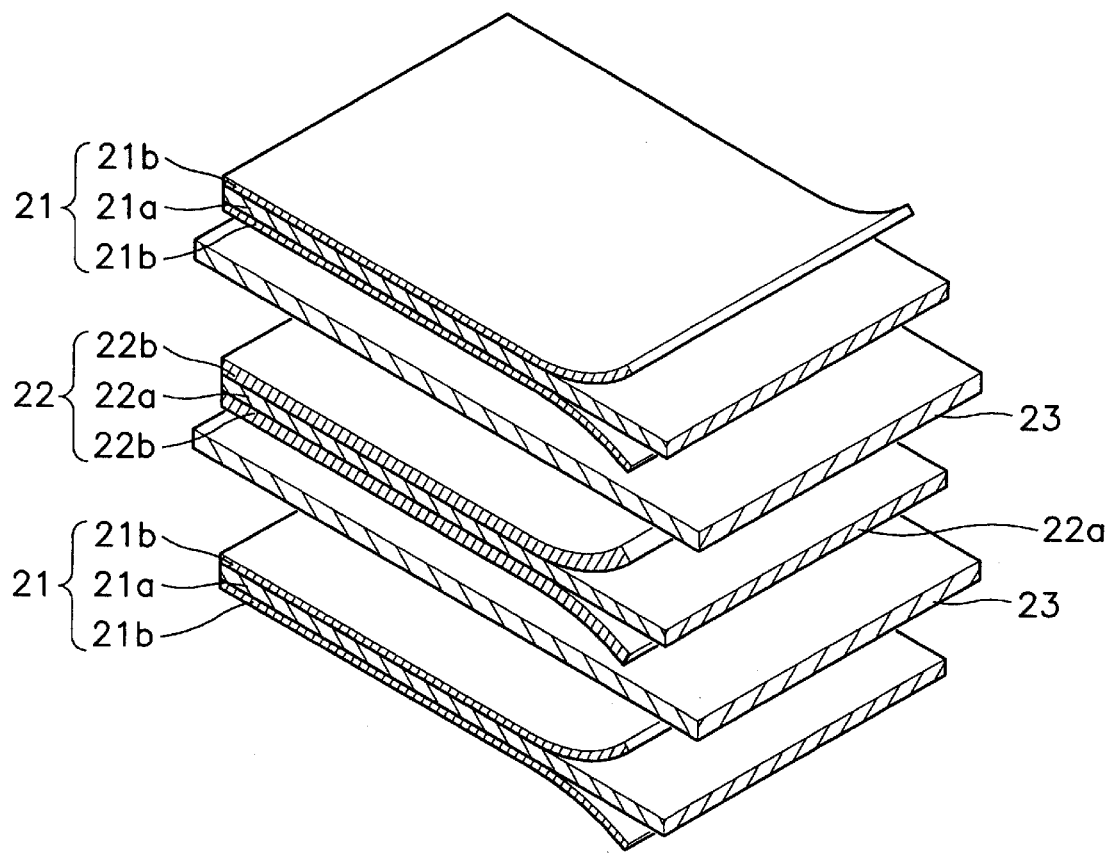
FIG. 3 is an exploded perspective view illustrating a unit battery cell having a bi-cell structure in a lithium polymer secondary battery.

Referring to FIG. 1 illustrating a method for manufacturing a lithium polymer secondary battery according to the present invention, first, a unit cathode plate, a unit anode plate and a separator are fabricated (step 43). Plasticizer is extracted from the unit cathode plate, the unit anode plate and the separator and then they are dried (step 44). Then, a unit battery cell having a mono-cell or bi-cell structure is formed (step 45). A plurality of unit battery cells are stacked and connected in parallel to form a battery cell (step 46). Then, the battery cell is impregnated with an electrolytic solution (step 47), and the battery cell is encased (step 48), thereby completing the lithium polymer secondary battery. The method for manufacturing a lithium polymer secondary battery will now be described in detail with reference to FIGS. 2, 3 and 4.

First, the step of fabricating a unit cathode plate 21, a unit anode plate 22 and a separator 23 (step 43 of FIG. 1) is divided into several sub-steps as follows.

A cathode plate is formed by forming a cathode active material layer on at least one surface of a cathode current collector, and an anode plate is formed by forming an anode active material layer on at least one surface of an anode current collector.

The cathode plate and the anode plate are cut into a predetermined size to fabricate the unit cathode plate 21 and the unit anode plate 22. Here, a cathode tab 26a or an anode tab 24a may be formed on the unit cathode plate 21 or the unit anode plate 22. The cathode tab 26a or the anode tab 24a may be drawn out at one side of the cathode current collector 21a or the anode current collector 22a, or may be separately welded to one side thereof.

Alternatively, in order to form a cathode active material layer 21b on the cathode current collector 21a and to form an anode active material layer 22b on the anode current collector 22a, each electrode sheet may be laminated on the cathode and anode current collectors 21a and 22a. Otherwise, electrode active material slurries may directly coat the cathode and anode current collectors 21a and 22a.

The former case of laminating each electrode sheet on the cathode and anode current collectors 21a and 22a will first be described.

The electrode active material slurries, i.e., a cathode active material slurry and an anode active material slurry are prepared, and thin-film electrode sheets, i.e., a cathode sheet and an anode sheet, are formed using a doctor-blade. Then, the electrode sheets are fixedly deposited on the cathode and anode current collectors 21a and 22a, each having a predetermined thickness, by a lamination method, thereby forming the cathode active material layer 21b and the anode active material layer 22b on the cathode current collector 21a and the anode current collector 22a, respectively.

Here, the cathode and anode active material slurries are prepared by dissolving 10% by weight of a polyvinylidene fluoride (PVDF) binder in acetone, mixing 15 to 18% by weight of a plasticizer therewith to prepare a binder solution, pouring 2 to 5% by weight of a carbon black conductive agent and 70% by weight of a $LiCoO_2$ cathode active material or a carbon anode active material into the binder solution, and sufficiently stirring the resultant mixture so that the viscosity of the mixture becomes 20,000 cps. The cathode current collector 21a may be aluminum having a predetermined thickness, for example, about 5 to about 30 μm, and the anode current collector 22a may be of copper having a predetermined thickness, for example, about 5 to about 20 μm. As the cathode and anode current collectors 21a and 22a, expanded metal, punched metal or a foil may be preferred.

The electrode active material slurries directly coat on the current collectors as follows.

A cathode active material slurry and an anode active material slurry are prepared and then directly applied to the cathode current collector 21a and the anode current collector 22a, respectively, by a doctor-blade. In this case, since no lamination is performed, the process is simplified, the contact area between each electrode active material slurry and each electrode current collector increases and the adhesiveness therebetween is thus improved.

Here, as in the former case, as cathode current collector 21a, an aluminum foil having a predetermined thickness, for example, about 5 to about 30 $\mu$m, is preferred, and as the anode current collector 22a, a copper foil having a predetermined thickness, for example, about 5 to about 20 $\mu$m, is preferred. Also, the cathode and anode active material slurries are prepared by dissolving 10% by weight of a PVDF binder in a solvent, specifically, N-methyl-2-pyrrolidone (NMP), mixing 18% by weight of a plasticizer therewith to prepare a binder solution, pouring 2% by weight of a carbon black conductive agent and 70% by weight of a $LiCoO_2$ cathode active material or a carbon anode active material into the binder solution, and sufficiently stirring the resultant mixture so that the viscosity of the mixture becomes 20,000 to 50,000 cps.

The separator 23 is formed by forming a thin slurry comprising a binder produced by mixing PVDF and hexafluoropropene (HFP), silica, a plasticizer and a solvent to a predetermined thickness, for example, about 40 $\mu$m.

Next, the plasticizer is extracted from the unit cathode plate 21, the unit anode plate 22 and the separator 23 using a solvent, such as ether, and dried (step 44).

If the plasticizer is extracted from the unit cathode plate 21, the unit anode plate 22 and the separator 23, nano-size pores are produced in a space where the plasticizer is extracted. The micro-size pores formed by active materials in the cathode and anode plates are connected to one another by the nano-size pores. Further, the nano-size pores produced in the space where the plasticizer is extracted are not removed even after a laminating process in which heat and pressure are applied. Thus, an electrolyte solution can be easily impregnated therein.

Also, since the plasticizer is extracted from the unit cathode plate 21, the unit anode plate 22 and the separator 23 before a laminating process of a bi-cell or mono-cell structure, described later, the following advantages can be attained.

The plasticizer extraction process can be shortened. Also, instead of a process of drying a unit battery cell having a bi-cell or mono-cell structure, the unit cathode plate 21, the unit anode plate 22, and the separator 23 are separately dried in each drying process. Thus, the drying process can be shortened. Further, it is possible to avoid bubbling which may occur in the case of extracting a plasticizer from a unit battery cell having a bi-cell or mono-cell structure. Thus, battery productivity can be improved.

Also, since the plasticizer extraction process is not affected by the shapes of the cathode and anode current collectors 21a and 22a, expanded metal, punched metal or a foil may be used as the cathode and anode current collectors 21a and 22a.

Next, the unit cathode plate 21, the unit anode plate 22 and the separator 23 are stacked to have a mono-cell or bi-cell structure, thereby forming a unit battery cell (step 45).

The unit battery cell having a mono-cell structure (see FIG. 2) can be fabricated by stacking the unit cathode plate 21, the unit anode plate 22, and the separator 23 through in a laminating process. The unit battery cell having a bi-cell structure (see FIG. 3) can be fabricated by sequentially stacking the unit cathode plate 21, the separator 23, the unit anode plate 22, the separator 23 and the unit cathode plate 21 through the laminating process.

Thereafter, a plurality of unit battery cells having a bi-cell or mono-cell structure are laminated and connected in parallel (step 46). Here, the resultant structure is a non-activated battery cell 20 which is not impregnated with an electrolyte solution.

Figure 4:
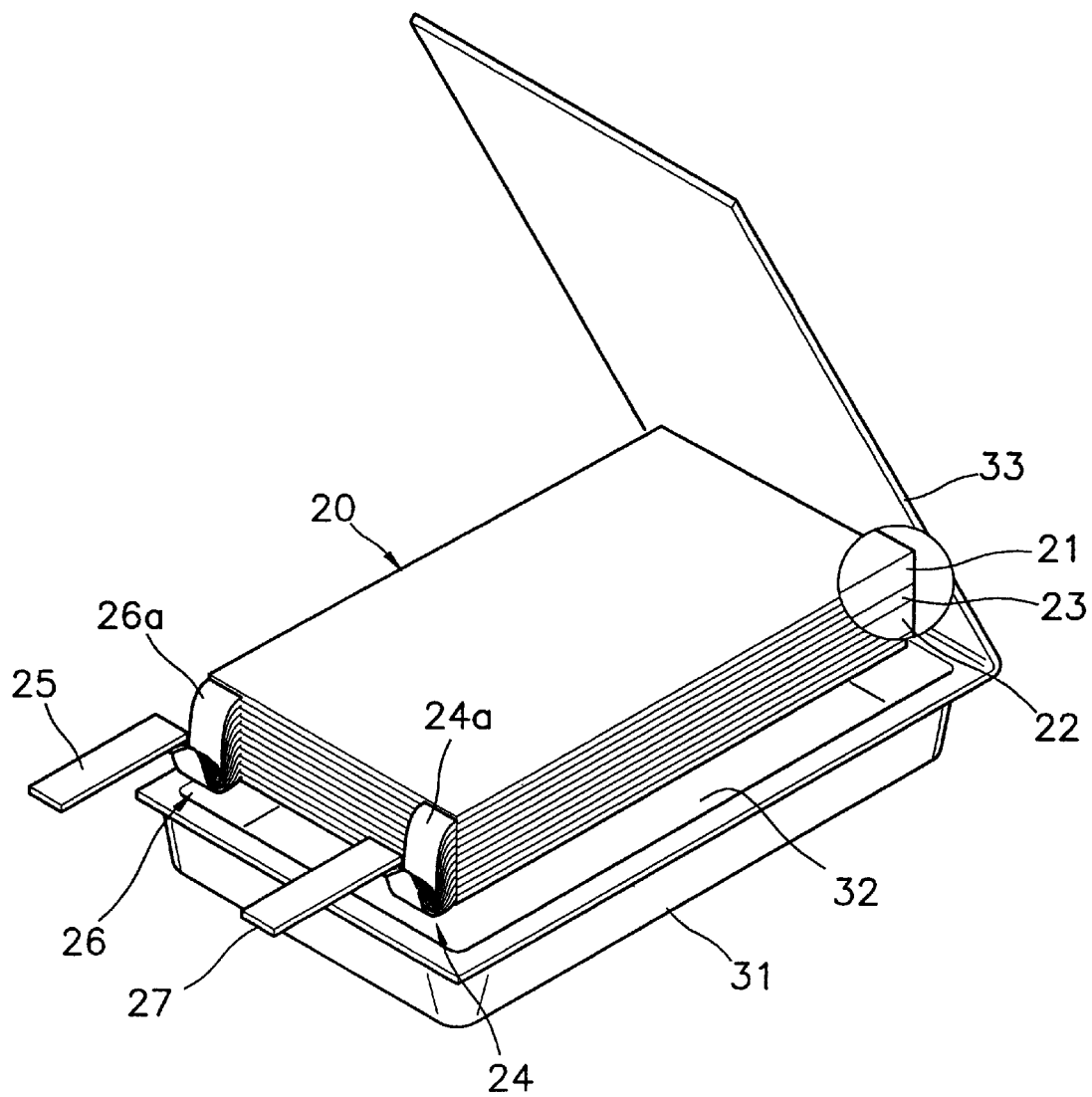
FIG. 4 is an exploded perspective view of a lithium polymer according to the present invention.

Referring to FIG. 4, a cathode tab group 26 consisting of a plurality of cathode tabs 26a each formed or fixed to the unit cathode plate 21 is connected to a cathode terminal 25 having a predetermined length by welding or another method, and an anode tab group 24 consisting of a plurality of anode tabs 24a each formed or fixed to the unit anode plate 22 is connected to an anode terminal 27 having a predetermined length by welding or another method. The cathode terminal 25 and the anode terminal 27 are encased and connected to an external circuit (not shown) for supplying electrical energy.

Next, the electrolyte solution is impregnated (step 47) to fabricate a hybrid polymer battery cell 20 which is impregnated with the electrolyte solution. Then, the battery cell is hermetically sealed and encased (step 48).

As shown in FIG. 4, in a state where the cathode tab group 26 and the anode tab group 24 are folded in a V-shape and closely fixed to one inner wall of a space 32 in a lower case 31, the battery cell 20 is mounted in the space 32 of the lower case 31 and then the lower case 31 and an upper case 33 are hermetically sealed to each other. Here, the cathode terminal 25 and the anode terminal 27 are disposed at the interface between sealing portions of the lower case 31 and the upper case 33 and drawn outward.

While the present invention has been described with respect to what is presently considered to be the preferred embodiment, it is to be understood that the disclosed embodiment is provided only for an exemplary embodiment. To the contrary, the present invention is intended to cover various modifications and equivalent arrangements included within the spirit and scope of the appended claims. Accordingly, the true scope and spirit of the invention will be indicated by the following claims.

What is claimed is:

1. A method for manufacturing a lithium polymer secondary battery comprising:
   separately fabricating
   a unit cathode plate comprising a cathode active material layer containing a plasticizer, and a cathode current collector on which the cathode active material is disposed,
   a unit anode plate comprising an anode active material layer containing a plasticizer, and an anode current collector on which the anode active material is disposed, and
   a separator containing a plasticizer;
   extracting the plasticizer from the unit cathode plate, the unit anode plate, and the separator, and drying the unit cathode plate, the unit anode plate, and the separator;
   stacking the unit cathode plate and the unit anode plate and interposing the separator therebetween to form a unit battery cell; and
   impregnating the unit battery cell with an electrolyte solution.

2. The method according to claim 1, including fabricating the unit cathode plate by forming the cathode active material layer on at least one surface of the cathode current collector and cutting the cathode current collector to size, and fabricating the unit anode plate by forming the anode active material layer on at least one surface of the anode current collector and cutting the anode current collector to size.

3. The method according to claim 1, including forming the unit cathode plate by laminating a cathode sheet made from a cathode active material slurry to the cathode current collector, and forming the unit anode plate by laminating an anode sheet made from an anode active material slurry to the anode current collector.

4. The method according to claim 1, including forming the unit cathode plate by directly applying a cathode active material slurry to the cathode current collector, and forming the unit anode plate by directly applying an anode active material slurry to the anode current collector.

5. The method according to claim 1, including forming the unit cathode plate by laminating a cathode sheet made from a cathode active material slurry to the cathode current collector, and forming the unit anode plate by directly applying an anode active material slurry to the anode current collector.

6. The method according to claim 1, wherein the anode current collector is a foil.

7. The method according to claim 3, wherein the anode current collector is a foil.

8. The method according to claim 1, including, before impregnating the unit battery cell with an electrolyte solution, stacking a second separator on the unit anode plate, on an opposite side from the separator, and stacking a second unit cathode plate on the second separator to form a bi-cell structure.

9. The method according to claim 3, wherein the cathode current collector is a foil.

10. The method according to claim 1, wherein the cathode current collector is a foil.

11. A lithium polymer secondary battery having a unit cathode plate, a unit anode plate, a separator insulating the unit cathode plate and the unit anode plate from each other, and a hybrid polymer electrolyte providing a passage for movement of lithium ions, the lithium polymer secondary battery being made by the method defined in claim 1.

12. The lithium polymer secondary battery according to claim 11, including a plurality of unit battery cells, each unit battery cell having a bi-cell structure comprising a first unit cathode plate, a first separator, a unit anode plate, a second separator, and a second unit cathode plate, sequentially stacked.

13. The method according to claim 1, including forming the unit cathode plate by directly applying a cathode active material slurry to the cathode current collector, and forming the unit anode plate by laminating an anode sheet made from an anode active material slurry to the anode current collector.

14. The method according to claim 2, wherein the anode current collector is a foil.

15. The method according to claim 2, wherein the cathode current collector is a foil.

16. The method according to claim 4, wherein the anode current collector is a foil.

17. The method according to claim 4, wherein the cathode current collector is a foil.

18. The method according to claim 5, wherein the anode current collector is a foil.

19. The method according to claim 5, wherein the cathode current collector is a foil.

\* \* \* \* \*